(12) United States Patent
Wolas

(10) Patent No.: US 10,286,817 B2
(45) Date of Patent: *May 14, 2019

(54) VEHICLE SEAT WITH SLIDABLE AIR COUPLING

(71) Applicant: Gentherm Inc., Northville, MI (US)

(72) Inventor: Scott Richard Wolas, Newbury Park, CA (US)

(73) Assignee: Gentherm Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,508

(22) Filed: Mar. 20, 2018

(65) Prior Publication Data

US 2018/0208090 A1 Jul. 26, 2018

Related U.S. Application Data

(63) Continuation of application No. 15/204,526, filed on Jul. 7, 2016, now Pat. No. 10,023,084.

(Continued)

(51) Int. Cl.
*A47C 7/74* (2006.01)
*B60N 2/56* (2006.01)
*B60N 2/06* (2006.01)

(52) U.S. Cl.
CPC .............. *B60N 2/5628* (2013.01); *B60N 2/06* (2013.01); *B60N 2/5657* (2013.01); *B60N 2/5692* (2013.01)

(58) Field of Classification Search
CPC ...... B60N 2/5628; B60N 2/5657; B60N 2/06; B60N 2/5692

(Continued)

(56) References Cited

U.S. PATENT DOCUMENTS

| 3,983,317 A | 9/1976 | Glorioso |
| 4,840,115 A | 6/1989 | Johnson et al. |

(Continued)

FOREIGN PATENT DOCUMENTS

| DE | 602004003298 | 6/2007 |
| DE | 102007042055 | 3/2009 |

(Continued)

OTHER PUBLICATIONS

Chinese Office Action for CN Application No. 201610836265.4 dated Feb. 23, 2018, including English translation.

(Continued)

*Primary Examiner* — Rodney B White

(74) *Attorney, Agent, or Firm* — Carlson, Gaskey & Olds, P.C.

(57) ABSTRACT

A conditioned air delivery system for a vehicle seat includes a seat and an air distribution plenum associated with the seat. A seat adjuster is configured to move the seat between multiple positions. An adjustable duct has a fixed duct portion and a movable duct portion that is configured to slide relative to the fixed duct portion as the seat moves between the multiple positions. The adjustable duct is configured to receive air from a conditioned air supply source and supply the air to the air distribution plenum. The fixed duct portion has a first opening and the movable duct portion includes a second opening that is in fluid communication with the first opening. The adjustable duct provides a forward/aft path of longitudinal sliding movement. A seal has terminal ends spaced apart from one another in the forward/aft path. The fixed and movable duct portions and the seal are configured to maintain fluid communication between the first and second openings throughout the longitudinal sliding movement of the seal along the forward/aft path.

17 Claims, 5 Drawing Sheets

Related U.S. Application Data

(60) Provisional application No. 62/192,886, filed on Jul. 15, 2015.

(58) Field of Classification Search
USPC .................................. 297/180.13, 180.14
See application file for complete search history.

(56) References Cited

U.S. PATENT DOCUMENTS

| | | |
|---|---|---|
| 5,138,851 A | 8/1992 | Mardikian |
| 5,626,386 A | 5/1997 | Lush |
| 6,059,018 A | 5/2000 | Yoshinori |
| 6,478,369 B1 | 11/2002 | Aoki et al. |
| 7,950,735 B2 | 5/2011 | Major et al. |
| 8,672,411 B2 | 3/2014 | Gomes |
| 9,004,993 B2 | 4/2015 | Fujii |
| 9,527,479 B2 | 12/2016 | Schneider |
| 9,676,246 B2 | 6/2017 | Chen et al. |
| 10,023,084 B2 * | 7/2018 | Wolas ............... B60N 2/5628 |
| 2002/0105213 A1 | 8/2002 | Rauh |
| 2004/0245811 A1 | 12/2004 | Bevan |
| 2005/0173950 A1 | 8/2005 | Bajic |
| 2005/0184565 A1 | 8/2005 | Weiss et al. |
| 2006/0032265 A1 | 2/2006 | Shaw |
| 2006/0138810 A1 | 6/2006 | Knoll |
| 2007/0176471 A1 | 8/2007 | Knoll |
| 2010/0327637 A1 | 12/2010 | Bajic |
| 2013/0097777 A1 | 4/2013 | Marquette |
| 2013/0165033 A1 | 6/2013 | Fitzpatrick |
| 2014/0152058 A1 | 6/2014 | Line |
| 2014/0179212 A1 | 6/2014 | Space |
| 2015/0140915 A1 | 5/2015 | Rawlison |
| 2015/0329026 A1 | 11/2015 | Hall |
| 2015/0329028 A1 | 11/2015 | Ogino |
| 2016/0144686 A1 | 5/2016 | Fujii |
| 2016/0250956 A1 | 9/2016 | Seiting |

FOREIGN PATENT DOCUMENTS

| | | |
|---|---|---|
| DE | 102006051703 | 4/2009 |
| EP | 1493600 | 1/2005 |
| EP | 1527913 | 5/2005 |
| EP | 2778064 | 9/2014 |
| JP | H06323805 | 11/1994 |
| JP | 2007015438 | 1/2007 |
| JP | 2008168776 | 7/2008 |

OTHER PUBLICATIONS

Korean Office Action dated Sep. 5, 2017 for KR Application No. 1020160087273—English trans and Korean Office Action.

Article—Development of S-FLOW System & Control. Koichi Tabei Published Apr. 8, 2013. Downloaded from SAE International Mar. 23, 2018. pp. 1-9.

* cited by examiner

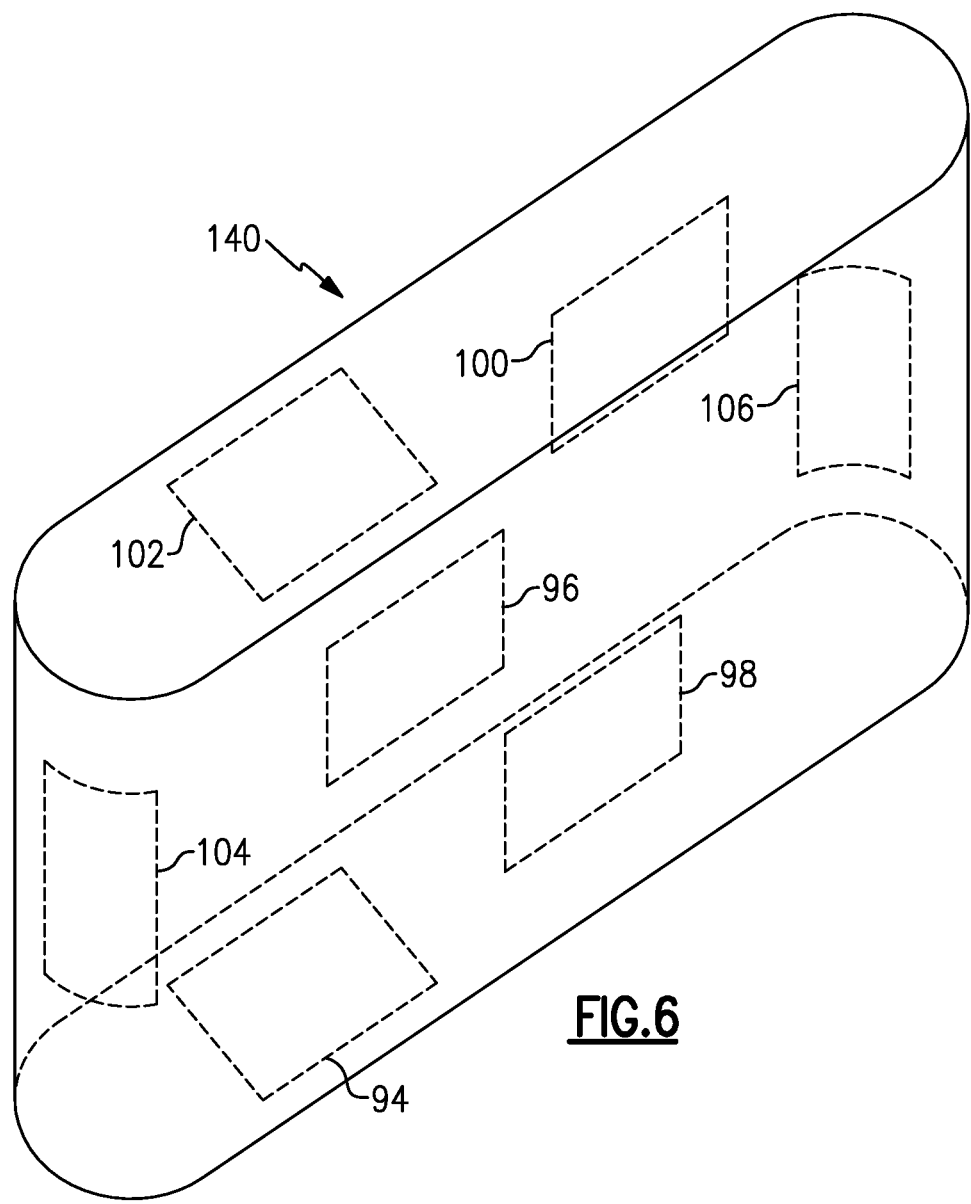

VEHICLE SEAT WITH SLIDABLE AIR COUPLING

CROSS-REFERENCE TO RELATED APPLICATIONS

This application is a continuation of U.S. application Ser. No. 15/204,526 filed Jul. 7, 2016, now U.S. Pat. No. 10,023,084 B2, which claims priority to U.S. Provisional Application No. 62/192,886, which was filed on Jul. 15, 2015 and is incorporated herein by reference.

BACKGROUND

This disclosure relates to a conditioned air delivery system for a vehicle seat and an adjustable duct for the system.

It is increasingly desirable to provide a more finely tuned thermally conditioned environment for vehicle occupants. As a result, it is common for vehicle seats to be conditioned in some manner. One example conditioned seats utilizes conditioned air supplied to an air distribution plenum beneath an aesthetic seat cover. Conditioned air is supplied from a conditioned air source to the air distribution plenum, which expels the conditioned air through perforations in the cover adjacent to a seated vehicle occupant.

One challenge in such a seat air conditioning system is the delivery of air to a seat that is adjustable with respect to its support structure. One approach has been to connect a relatively long flexible duct from the conditioned air source to a blower supported by the seat. As the seat is adjusted fore/aft or up/down, the flexible duct may become somewhat pinched, which may obstruct the flow of conditioned air to the seat. To address this potential problem, a reticulated foam or porous material is provided in the flexible duct to make the flexible duct less susceptible to collapsing during seat adjustment.

SUMMARY

In one exemplary embodiment, a conditioned air delivery system for a vehicle seat includes a seat and an air distribution plenum associated with the seat. A seat adjuster is configured to move the seat between multiple positions. An adjustable duct has a fixed duct portion and a movable duct portion that is configured to slide relative to the fixed duct portion as the seat moves between the multiple positions. The adjustable duct is configured to receive air from a conditioned air supply source and supply the air to the air distribution plenum. The fixed duct portion has a first opening and the movable duct portion includes a second opening that is in fluid communication with the first opening. The adjustable duct provides a forward/aft path of longitudinal sliding movement. A seal has terminal ends spaced apart from one another in the forward/aft path. The fixed and movable duct portions and the seal are configured to maintain fluid communication between the first and second openings throughout the longitudinal sliding movement of the seal along the forward/aft path.

In a further embodiment of any of the above, the first opening has an aperture. The movable duct portion is slidably received in the aperture. The movable duct portion includes a second opening that is in fluid communication with the first opening through the aperture.

In a further embodiment of any of the above, the conditioned air supply source is a vehicle HVAC system.

In a further embodiment of any of the above, a center console includes a refrigerant loop with a micro pump. The refrigerant loop provides the conditioned air supply source.

In a further embodiment of any of the above, the fixed duct portion is mounted to the center console.

In a further embodiment of any of the above, seat tracks support the seat. The multiple positions correspond to forward and aft directions along the seat tracks.

In a further embodiment of any of the above, the adjustable duct is arranged laterally between the seat tracks.

In a further embodiment of any of the above, the fixed duct portion is mounted to a floor.

In a further embodiment of any of the above, the movable duct portion is mounted to the seat.

In a further embodiment of any of the above, the seat includes a blower that is in fluid communication with and fluidly between the adjustable duct and the air distribution plenum.

In a further embodiment of any of the above, the fixed duct portion includes the spaced apart channels. The movable duct portion is slidable within the channels.

In a further embodiment of any of the above, the seal is provided on opposing sides of the movable duct portion.

In a further embodiment of any of the above, the second opening is spaced apart from an inlet in the seat to provide a gap therebetween. The inlet is configured to supply the conditioned air to the air distribution plenum.

In a further embodiment of any of the above, the fixed duct portion includes a cavity. The movable duct portion includes a baffle that extends into the cavity to provide a dead volume in the cavity.

In a further embodiment of any of the above, a flexible tube interconnects the movable duct portion to the seat to fluidly connect the adjustable duct to the air distribution plenum.

In a further embodiment of any of the above, the seal is flexible such that the seal is capable of bending as the seal curves about rounded ends of the fixed duct portion.

In a further embodiment of any of the above, the seal includes a flexible sheet and flexible slats such that the seal spans and seals the aperture.

BRIEF DESCRIPTION OF THE DRAWINGS

The disclosure can be further understood by reference to the following detailed description when considered in connection with the accompanying drawings wherein:

FIG. 6 is a schematic view of an adjustable duct illustrating example opening locations through which the conditioned air may flow.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
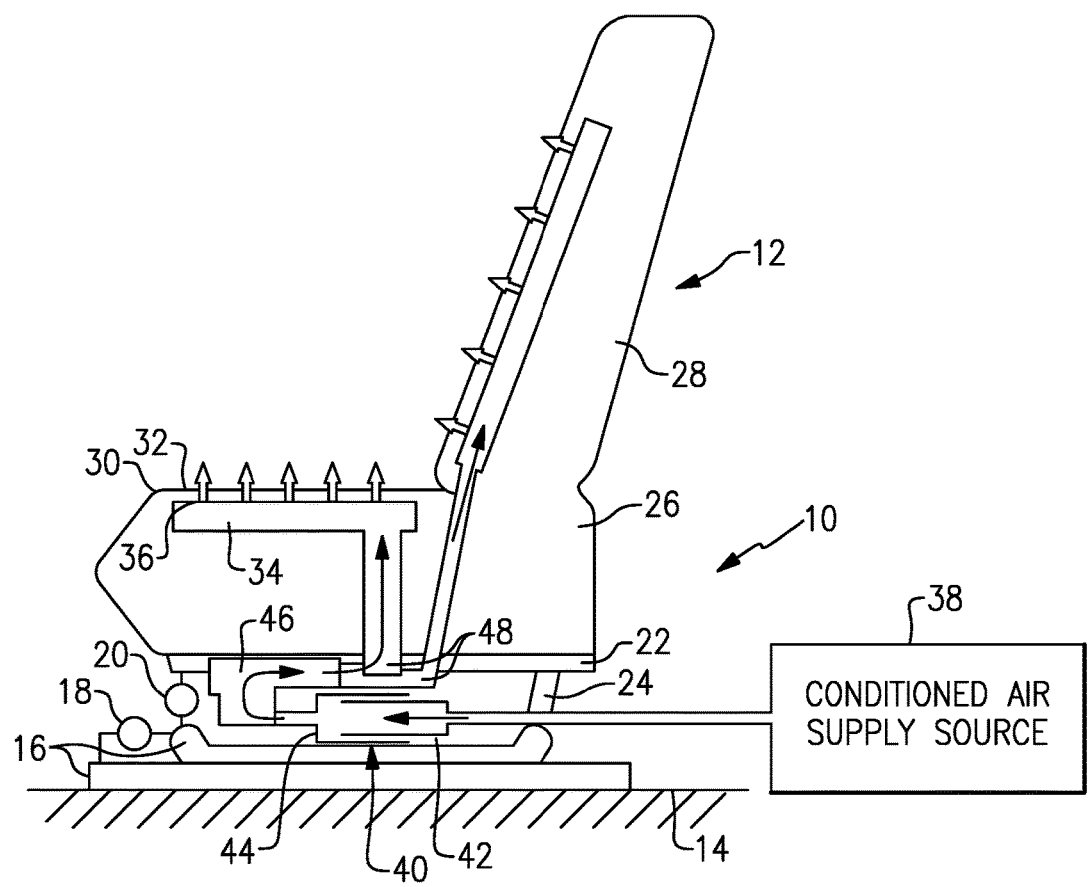
FIG. 1 is a schematic view of a conditioned air delivery system for a vehicle seat with an adjustable duct.

A conditioned air delivery system 10 is schematically illustrated in FIG. 1. The system 10 includes a vehicle seat 12 movably mounted to a static support structure 14, such as a vehicle floor. Seat tracks 16 interconnect the seat 12 to the support structure 14 to permit fore/aft movement of the seat 12. First and second seat adjusters 18, 20 are provided between the seat 12 and the tracks 16. In one example, the first seat adjuster 18 adjusts the fore/aft position of the seat 12 by sliding the tracks 16 relative to one another, and the second seat adjuster 20 adjusts the vertical position of the seat 12. A tilt adjuster may also be provided as well as other seat adjusters, if desired.

The seat 12 includes a bottom 26 and a back 28. The bottom 26 includes a frame 22 supported on the tracks 16 by brackets 24. Aesthetic covers 30 are provided over the seat bottom 26 and back 28 and include perforations 32. An air distribution plenum 34 is provided in each of the bottom 26 and back 28 and includes holes 36. Conditioned air (shown by arrows) is provided to the air distribution plenums 34, which is expelled through the holes 36 to the perforations 32 at a location adjacent to the vehicle occupant (not shown).

A conditioned air supply source 38 provides conditioned air, heated and/or cooled air, to the air distribution plenums 34. Ambient/vented air may also be supplied. An adjustable duct 40 is configured to accommodate the movement of the seat 12 and maintain fluid communication of the conditioned air from the source 38 to the air distribution plenums 34. The adjustable duct 40 provides an air coupling that includes fixed and moveable duct portions 42, 44 that are movable with respect to one another and are not subject to pinching. In the example embodiment, the fixed and movable duct portions 42, 44 slide with respect to one another.

One or more blowers 46 may be mounted to the frame 22. In one example, a blower may be provided for each of the bottom and back air distribution plenums to provide more refined control of conditioned air to the seat. One or more flexible tubes 48, which are relatively short in length such that they are not subject to pinching, may interconnect the adjustable duct 40 and/or the air distribution plenums 34 to the blower 46.

Figure 2A:
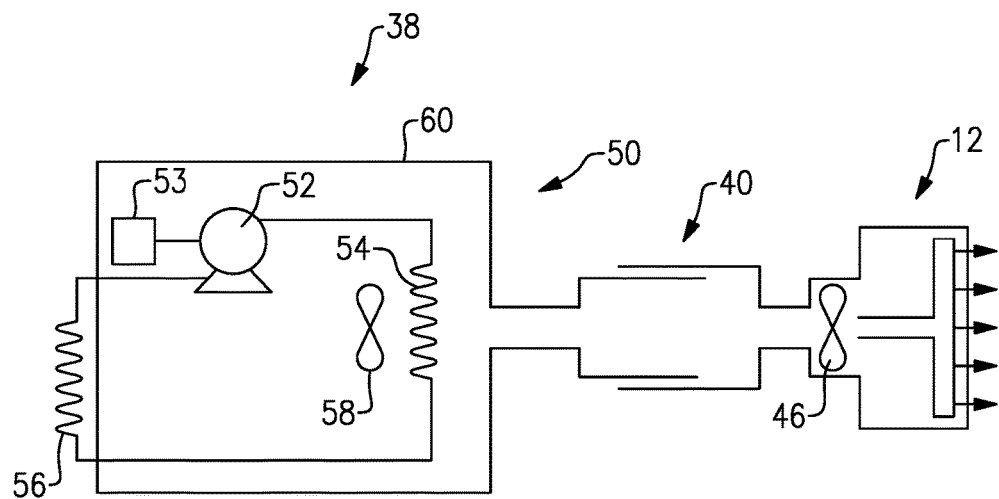
FIG. 2A is a schematic view of one example air conditioning system used to supply conditioned air to the adjustable duct.

A heating, ventilation, and cooling (HVAC) system 50 provided the conditioned air supply source 28 and communicates the conditioned air to the adjustable duct 40, as is shown in FIG. 2A. In one example system 50, a pump 52 circulates a refrigerant to an evaporator 54 and a condenser 56. An expansion valve is not shown. A fan 58 blows air across the evaporator 54 to provide conditioned air to the adjustable duct 40. In the example, the pump 52 is driven by an electric motor 53 to provide a compact micro pump that enables the system 50 to at least partially be housed within a small space within the vehicle cabin, such as a center console 60 provided between driver and passenger seats of the vehicle. Such an HVAC system may act as an auxiliary system to the vehicle's conventional HVAC system.

Figure 2B:
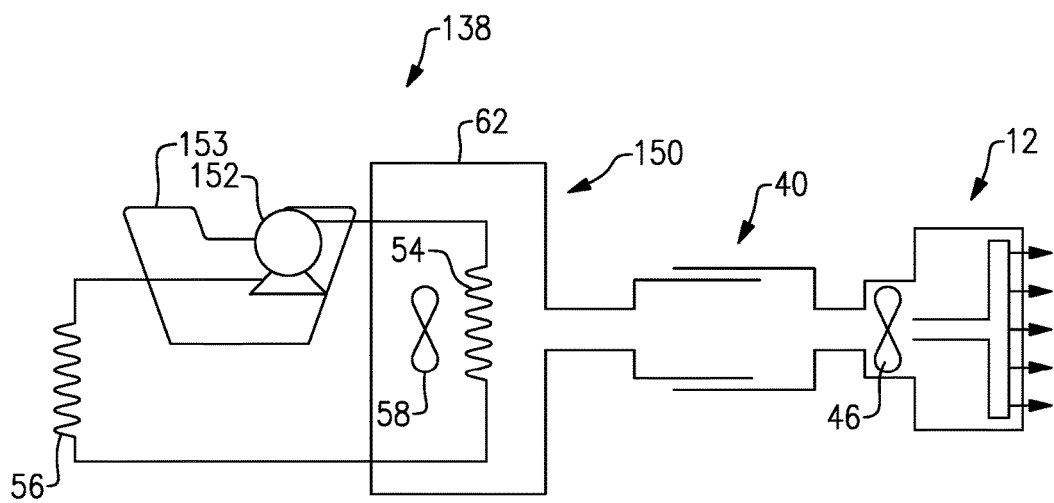
FIG. 2B is another example air conditioning system used to supply conditioned air to the adjustable duct.

Another example HVAC system 150 is illustrated in FIG. 2B. The system 150 is provided by a typical vehicle conditioned air supply source 138 that includes the vehicle heating or refrigerant system associated with the vehicle's engine, which drives the pump 152 to circulate fluids through the evaporator 54 and condenser 56. The vehicle air conditioning distribution system 62 supplies the conditioned air to the adjustable duct 40.

Figure 3A:
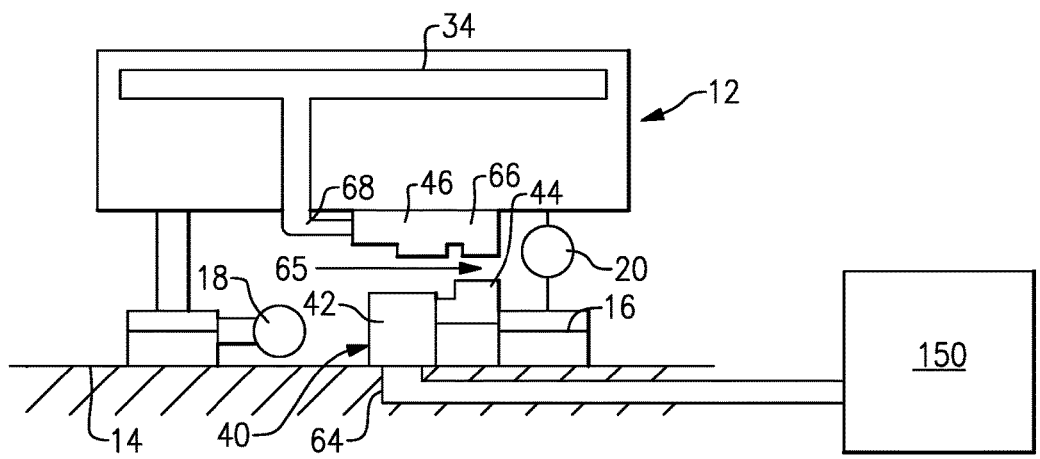
FIG. 3A is one example adjustable seat.

The adjustable duct 40 may be packaged in any number of suitable configurations. One such configuration is illustrated in FIG. 3A. The fixed duct 42 is mounted to the static support structure 14, for example, a fixed seat track, to receive conditioned fluid through a floor vent 64 in communication with the HVAC system 150. The moveable duct portion 44 is operatively connected to the seat 12 such that it slides relative to the fixed duct portion 42 during seat adjustments. In one example, the blower 46 includes an inlet 66 spaced from the movable duct portion 44 to provide a gap 65. This gap 65 increases and decreases as the vertical seat adjustor 20 moves the seat up and down with respect to the static support structure 14. In this manner, the vertical motion of the seat is accommodated without a flexible duct interconnecting the blower 46 to the adjustable duct 40. An outlet tube 68 connects the blower 46 to the air distribution plenum 34.

Figure 3B:
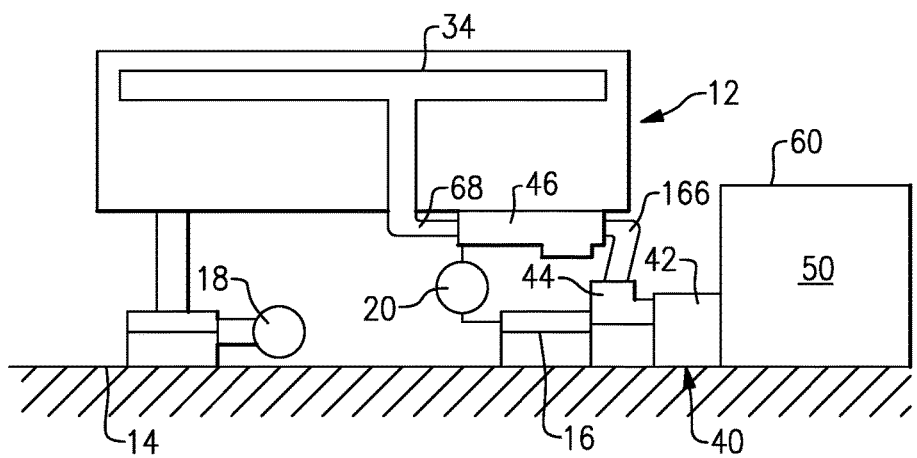
FIG. 3B is another example adjustable seat.

In the example shown in FIG. 3A, the adjustable duct 40 is arranged between the tracks 16. In the example illustrated in FIG. 3B, the adjustable duct 42 is arranged outside the tracks 16. The fixed duct portion 42 receives conditioned air from the center console 60. An inlet tube 166 supplies the conditioned air from the adjustable duct 40 to the blower 46. The moveable duct portion 44 is operatively connected to the seat 12.

The inlet and outlet tubes 166, 68 may include reticulated foam or porous material to prevent the tubes from collapsing. However, due to the relatively short lengths of the tubes, the tubes should not become pinched during seat adjustment.

Figure 4:
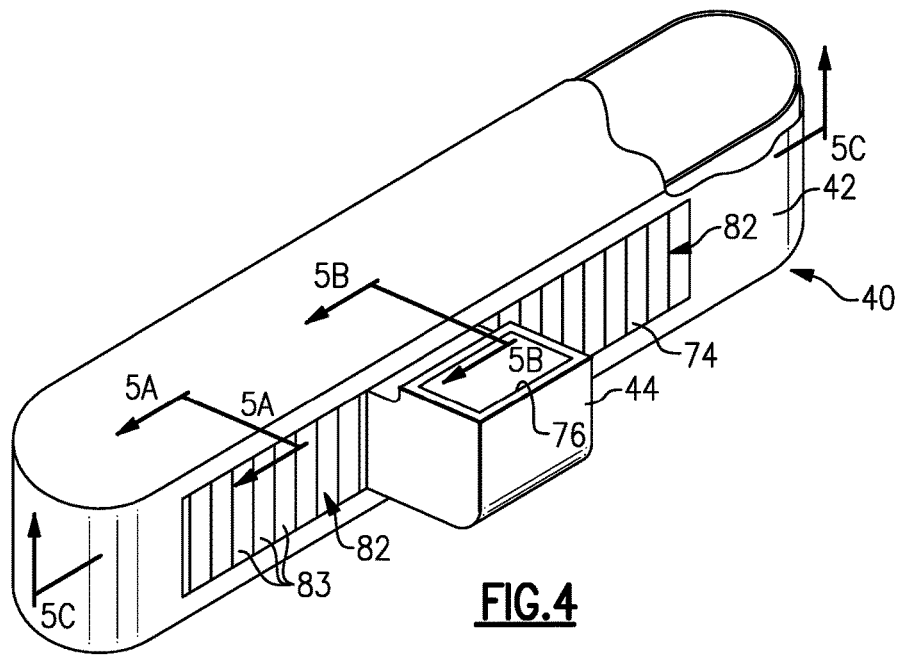
FIG. 4 is a perspective view of an example adjustable duct having fixed and moveable duct portions.
Figures 5A, 5B, 5C:
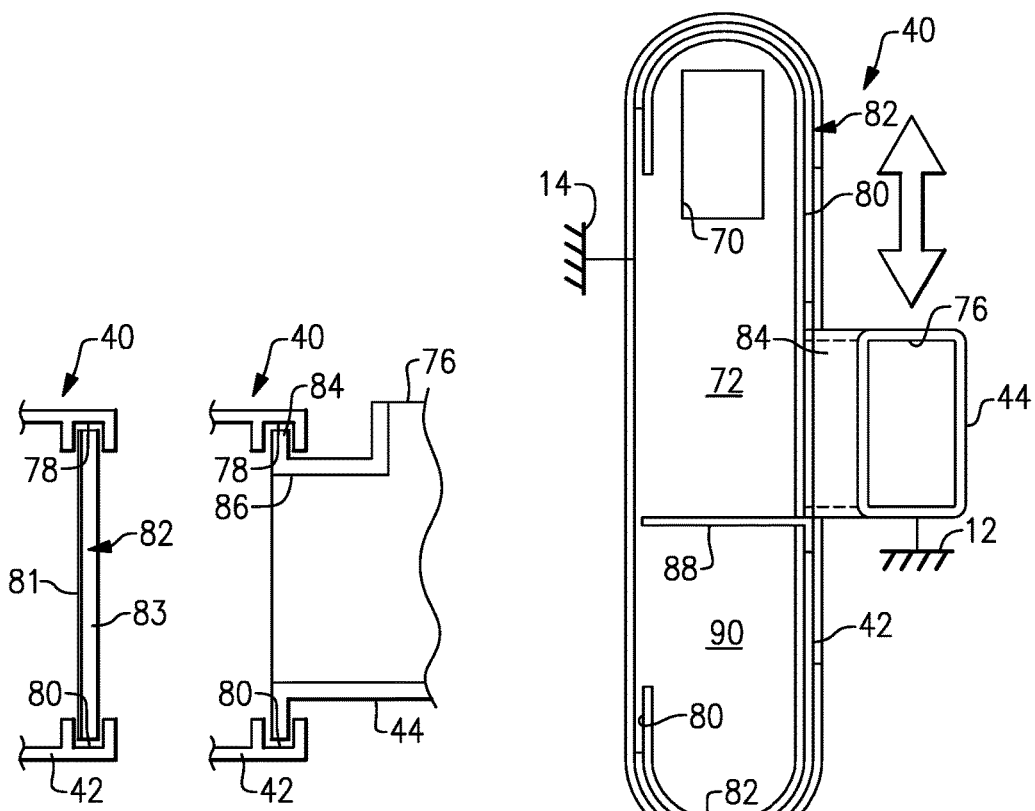
FIG. 5A is a cross-sectional view through the adjustable duct shown in FIG. 4 taken along line 5A-5A.
FIG. 5B is a cross-sectional view through the adjustable duct shown in FIG. 4 taken along line 5B-5B.
FIG. 5C is a cross-sectional view through the adjustable duct shown in FIG. 4 taken along line 5C-5C.

Referring to FIGS. 4-5C, an example adjustable duct 40 is illustrated. The fixed duct portion 42 provides a rigid housing that includes an elongated aperture 74. The moveable duct portion 44 is rigid and slidably received in the aperture 74. A first opening 70 provides an inlet into a cavity 72 provided by the fixed duct portion 42 in the example. The first opening 70 is positioned at a location that suitable for connection to the conditioned air supply source. The moveable duct portion 44 includes a second opening 76 that provides an outlet fluidly connected to the air distribution plenum. The second opening 76 may be provided in a different location on the movable duct portion 44 than shown.

A perimeter 84 of the moveable duct portion 44 surrounds a duct opening 86 and is captured between spaced apart channels 78, 80 in the fixed duct portion 42, which permit forward/aft longitudinal sliding movement of the moveable duct portion 44 with respect to the fixed duct portion 42. A seal 82 is provided on either side of the moveable duct portion 44 within the aperture 74 between channels 78, 80. The seals 82 slide within the channel 78, 80 as the moveable duct portion 44 moves forward/aft, as indicated by the arrow in FIG. 5C. The seals 82 are flexible in that they are capable of bending as the seals curves about the rounded ends of the fixed duct portions 42, as appreciated by the cross-section illustrated in FIG. 5C. Referring to FIGS. 4 and 5A, the seal 82 includes a flexible sheet 81 and slats 83 that enables the seal 82 to span and seal the aperture 74 while providing an ability to bend around turns. The sheet 81 and slats 83 may be discrete elements or integrated into a unitary structure. However, the seals 82 do not pinch or collapse during adjustment.

The moveable duct portion 44 may include a baffle 88 that extends into the cavity 72 to provide a dead volume 90 such that the entire volume of the adjustable duct 40 need not be filled, providing more efficient air delivery and reduced heat losses.

FIG. 6 schematically illustrates the adjustable duct 140 with its openings provided in any one of a number of positions 94-106. The openings are positioned in a manner that is convenient based upon the application and the location of the seat and packaging of the various components within the vehicle.

It should also be understood that although a particular component arrangement is disclosed in the illustrated embodiment, other arrangements will benefit herefrom. For example, the movable duct portion may be fixed relative to the static support structure and the fixed duct portion may be mounted to the seat. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A conditioned air delivery system for a vehicle seat, comprising:
   a seat;
   an air distribution plenum associated with the seat;
   a seat adjuster configured to move the seat between multiple positions;
   an adjustable duct has a fixed duct portion and a movable duct portion that is configured to slide relative to the fixed duct portion as the seat moves between the multiple positions, the adjustable duct is configured to receive air from a conditioned air supply source and supply the air to the air distribution plenum, wherein the fixed duct portion has a first opening and the movable duct portion includes a second opening that is in fluid communication with the first opening, the adjustable duct provides a forward/aft path of longitudinal sliding movement; and
   a seal has terminal ends spaced apart from one another in the forward/aft path, wherein the fixed and movable duct portions and the seal are configured to maintain fluid communication between the first and second openings throughout the longitudinal sliding movement of the seal along the forward/aft path.

2. The system according to claim 1, wherein the first opening has an aperture, and the movable duct portion is slidably received in the aperture, the movable duct portion includes a second opening that is in fluid communication with the first opening through the aperture.

3. The system according to claim 1, wherein the conditioned air supply source is a vehicle HVAC system.

4. The system according to claim 1, comprising a center console that includes a refrigerant loop with a micro pump, the refrigerant loop provides the conditioned air supply source.

5. The system according to claim 4, wherein the fixed duct portion is mounted to the center console.

6. The system according to claim 1, wherein seat tracks support the seat, and the multiple positions correspond to forward and aft directions along the seat tracks.

7. The system according to claim 6, wherein the adjustable duct is arranged laterally between the seat tracks.

8. The system according to claim 1, wherein the fixed duct portion is mounted to a floor.

9. The system according to claim 1, wherein the movable duct portion is mounted to the seat.

10. The system according to claim 1, wherein the seat includes a blower in fluid communication with and fluidly between the adjustable duct and the air distribution plenum.

11. The system according to claim 1, wherein the fixed duct portion includes spaced apart channels, the movable duct portion is slidable within the channels.

12. The system according to claim 11, wherein the seal is provided on opposing sides of the movable duct portion.

13. The system according to claim 1, wherein the second opening is spaced apart from an inlet in the seat to provide a gap therebetween, the inlet configured to supply the conditioned air to the air distribution plenum.

14. The system according to claim 1, wherein the fixed duct portion includes a cavity, the movable duct portion includes a baffle that extends into the cavity to provide a dead volume in the cavity.

15. The system according to claim 1, comprising a flexible tube interconnecting the movable duct portion to the seat to fluidly connect the adjustable duct to the air distribution plenum.

16. The system according to claim 1, wherein the seal is flexible such that the seal is capable of bending as the seal curves about rounded ends of the fixed duct portion.

17. The system according to claim 16, wherein the seal includes a flexible sheet and flexible slats such that the seal spans and seals the aperture.

* * * * *